United States Patent
Fan et al.

(10) Patent No.: US 10,536,003 B1
(45) Date of Patent: Jan. 14, 2020

(54) POWER SYSTEM STABILIZER FOR VOLTAGE SOURCE CONVERTERS

(71) Applicants: Lingling Fan, Tampa, FL (US); Zhixin Miao, Tampa, FL (US)

(72) Inventors: Lingling Fan, Tampa, FL (US); Zhixin Miao, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 16/261,870

(22) Filed: Jan. 30, 2019

Related U.S. Application Data

(60) Provisional application No. 62/701,029, filed on Jul. 20, 2018.

(51) Int. Cl.
| | |
|---|---|
| H02J 3/38 | (2006.01) |
| H02P 21/22 | (2016.01) |
| F03D 9/25 | (2016.01) |
| F03D 7/00 | (2006.01) |

(52) U.S. Cl.
CPC ............. H02J 3/386 (2013.01); F03D 7/00 (2013.01); F03D 9/257 (2017.02); H02P 21/22 (2016.02); F05B 2270/10 (2013.01); F05B 2270/337 (2013.01)

(58) Field of Classification Search
CPC .... H02J 3/01; H02J 3/36; H02J 3/386; H02M 1/12; H02M 1/14; H02M 1/15; H02M 5/458; H02M 5/4585; H02M 7/7575; Y02B 70/126; H02H 7/268; Y02E 40/40; H02P 21/22; F03D 9/257; F03D 7/00; F05B 2270/10; F05B 2270/337
USPC .................. 363/34, 35, 37, 40, 45
See application file for complete search history.

(56) References Cited

U.S. PATENT DOCUMENTS

| | | | | |
|---|---|---|---|---|
| 9,083,261 | B2* | 7/2015 | Yang | H02M 7/487 |
| 2012/0056602 | A1* | 3/2012 | Li | H02P 9/48 |
| | | | | 322/89 |
| 2012/0280569 | A1* | 11/2012 | Alam | H02J 3/32 |
| | | | | 307/60 |
| 2014/0307488 | A1* | 10/2014 | Brogan | H02M 5/4585 |
| | | | | 363/35 |
| 2017/0045589 | A1* | 2/2017 | Hernandez Manchola | |
| | | | | H02M 1/32 |

OTHER PUBLICATIONS

Alipoor, J. et al., "Power System Stabilization Using Virtual Synchronous Generator With Alternating Moment of Inertia," *IEEE Journal of Emerging and Selected Topics in Power Electronics*, Jun. 2015, 3(2):451-458, 2014 IEEE.

(Continued)

*Primary Examiner* — Yemane Mehari
(74) *Attorney, Agent, or Firm* — Saliwanchik, Lloyd & Eisenschenk

(57) ABSTRACT

Devices and methods for mechanism-based feedback controller employed in a wind powered power system are provided. A controller can include a vector control-based voltage source converter with feedback control circuitry. The feedback control circuitry is configured to modulate either a power order or a dc-link voltage order to control coupling between voltage and power. The controller can be connected to a wind-based turbine generator of a wind farm and regulate power deployed to a power grid.

17 Claims, 18 Drawing Sheets

(56) References Cited

OTHER PUBLICATIONS

Clark, K. et al., "Modeling of GE Wind Turbine-Generators for Grid Studies," *GE Energy*, Apr. 16, 2010, pp. 1-93, General Electric International, Inc.

Dissanayaka, A. et al., "Panhandle and South Texas Stability and System Strength Assessment," *Electranix Specialists in Power System Studies*, Mar. 28, 2018, pp. 1-37.

Egea-Alvarez, A. et al., "Advanced Vector Control for Voltage Source Converters Connected to Weak Grids," *IEEE Transactions on Power Systems*, Nov. 2015, 30(6):3072-3081, IEEE.

Fan, L. et al., "Modeling Type-4 Wind in Weak Grids," *IEEE Transactions on Sustainable Energy*, 2018, pp. 1-12, IEEE.

Fan, L. et al., "An Explanation of Oscillations Due to Wind Power Plants Weak Grid Interconnection," *IEEE Transactions on Sustainable Energy*, Jan. 2018, 9(1):488-490, 2017 IEEE.

Givaki, K. et al., "Current Error Based Compensations for VSC Current Control in Weak Grids for Wind Farm Applications," *IEEE Transactions on Sustainable Energy*, Jan. 2019, 10(1):26-35, 2018 IEEE.

Hu, J. et al., Modeling of Grid-Connected DFIG-Based Wind Turbines for DC-Link Voltage Stability Analysis, *IEEE Transactions on Sustainable Energy*, Oct. 2015, 6(4):1325-1336, IEEE.

Li, Y. et al., "Low-Frequency and Subsynchronous-Frequency Oscillations in Type-4 Wind with Weak Grid Interconnections," pp. 1-8.

Liu, H. et al., "Subsynchronous Interaction Between Direct-Drive PMSG Based Wind Farms and Weak AC Networks," *IEEE Transactions on Power Systems*, Nov. 2017, 32(6):4708-4720, IEEE.

Ma, H. T. et al., Sub-Synchronous Control Interaction Studies between Full-Converter Wind Turbines and Series-Compensated AC Transmission Lines, 2012, pp. 1-5, IEEE.

Fan, L. et al., "Wind in Weak Grids: 4 Hz or 30 Hz Oscillations?" *IEEE Transactions on Power Systems*, Sep. 2018, 33(5):5803-5804, IEEE.

Strachan, N. P. W. et al., "Stability of a Variable-Speed Permanent Magnet Wind Generator With Weak AC Grids," *IEEE Transactions on Power Delivery*, Oct. 2010, 25(4):2779-2788, IEEE.

Yuan, X. et al., DC-link Voltage Control of a Full Power Converter for Wind Generator Operating in Weak-Grid Systems, *IEEE Transactions on Power Electronics*, Sep. 2009, 24(9):2178-2192, IEEE.

Zhang, L. et al., "Power-Synchronization Control of Grid-Connected Voltage-Source Converters," *IEEE Transactions on Power Systems*, May 2010, 25(2):809-820, 2009 IEEE.

Zhou, Y. et al., "Connecting Wind Power Plant with Weak Grid-Challenges and Solutions," 2013, pp. 1-7, IEEE.

Huang, S. et al., "Voltage Control Challenges on Weak Grids with High Penetration of Wind Generation: ERCOT Experience," 2012, pp. 1-7, IEEE.

* cited by examiner

POWER SYSTEM STABILIZER FOR VOLTAGE SOURCE CONVERTERS

CROSS-REFERENCE TO RELATED APPLICATION

This application claims the benefit of U.S. Provisional Application Ser. No. 62/701,029, filed Jul. 20, 2018, the disclosure of which is hereby incorporated by reference in its entirety, including all figures, tables, and drawings.

BACKGROUND

4 Hz oscillations and 30 Hz oscillations have been observed in real world wind farms connected to weak grid power systems. Stability issues caused by these occurrences can limit the efficiency of the delivery of wind-based energy to a power grid.

Weak grid stability of power systems can be due to the coupling of the power delivery and the voltage at the point of common coupling (PCC). Increasing the power delivery can lead to a reduction in the PCC voltage and lead to instability in weak grid power systems. By reducing the instability in a weak grid power system, the delivery efficiency to a power grid can be enhanced.

BRIEF SUMMARY

Embodiments of the subject invention provide methods and devices for mechanism-based feedback control for vector control-based voltage source converters (VSCs) employed in wind-based power systems.

Embodiments of the subject invention provide methods and devices that reduce the coupling between power and voltage. Feedback control strategies are provided that can modulate either the power order or the dc-link voltage order with either the d-axis current or the PCC voltage as an input signal. Experiments of the PCC voltage feedback control have demonstrated the capability of the devices and methods for enhancing the stability of a power system and improved delivery of wind-based energy to a power grid.

DETAILED DISCLOSURE

The following disclosure and exemplary embodiments are presented to enable one of ordinary skill in the art to make and use controller system comprising a vector-based voltage source converter according to the subject invention. Various modifications to the embodiments will be readily apparent to those skilled in the art and the generic principles herein may be applied to other embodiments. Thus, the devices and methods related to the controller system comprising the vector-based voltage source converter are not intended to be limited to the embodiments shown, but are to be accorded the widest scope consistent with the principles and features described herein.

A "weak grid" power system comprises a grid in which voltage level does not remain as constant as in a "strong grid" power system, such that the voltage level and fluctuations need to be taken into account. Weak grid power systems can also be characterized by low short circuit capacity, low inertia, and low fault currents.

Figure 1:
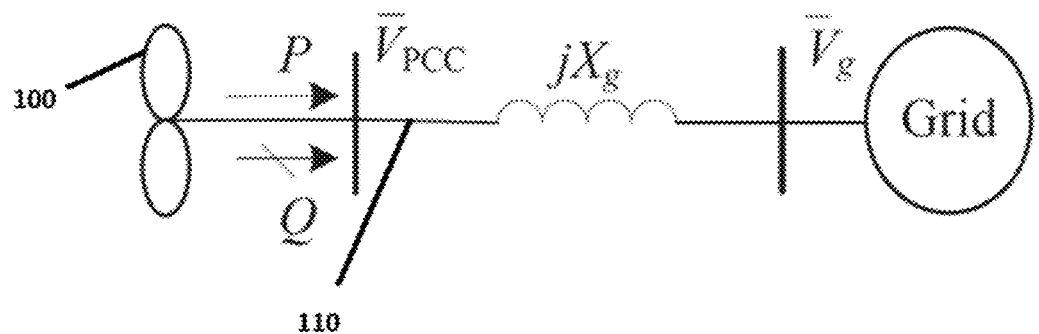
FIG. 1 is a diagram of a wind farm grid integration system.

FIG. 1 is a diagram illustrating a wind farm 100 connected to a grid through a transmission line 110, which can be represented as reactance, $X_g$, in a circuit diagram. A Type-3 or a Type-4 wind farm can be represented as a controllable current source in a circuit diagram. Both Type 3 and Type 4 wind farms employ voltage source converters (VSCs). A vector control method can be employed for a VSC.

Vector control can be based on the PCC voltage, (i.e., the dq-frame's d-axis is aligned with the PCC voltage space vector). Hence $P=V_{PCC}i_d$ and $Q=-V_{PCC}i_q$. For a given PCC voltage, adjusting the d-axis current can adjust the active power P and not influence the reactive power Q at the steady state. Similarly, adjusting the q-axis current can adjust the reactive power Q and not influence the active power P. The converter's outer control loops can generate dq-axis current orders and a current control effect can be represented by a first order delay.

The relationship between the wind farm currents, PCC voltage, and the grid voltage is as follows:

$$v_{PCC,d} + jv_{PCC,q} = jX_g(i_d + ji_q) + \overline{V}_g \qquad (1)$$

It is assumed that $\overline{V}_{PCC}$ is aligned with the d-axis so (1) can be rewritten as the following:

$$V_{PCC} = v_{PCC,d} = -X_g i_q + V_g \cos\delta \qquad (2)$$
$$0 = v_{PCC,q} = X_g i_d - V_g \sin\delta$$

wherein $\delta$ is the angle by which $\overline{V}_{PCC}$ is leading $\overline{V}_g$ and $\delta$ has a range of $$[-\frac{\pi}{2}, \frac{\pi}{2}].$$

Combining the two equations in (2) leads to the following:

$$V_{PCC} = -X_g i_q + \sqrt{V_g^2 - (X_g i_d)^2} \qquad (3)$$

$$\Delta V_{PCC} = -X_g \Delta i_q - c\Delta i_d \qquad (4)$$

wherein $$c = X_g \Big/ \sqrt{\left(\frac{V_g}{X_g i_d}\right)^2 - 1}, c > 0$$

and $c \to \infty$ if $i_d$ is close to the short circuit current, $V_g/X_g$.

Equation 4 indicates that an increase in the d-axis current leads to a reduction in the PCC voltage. Further, the linear expression of P versus $V_{PCC}$ and $i_d$ can be found as follows:

$$P = V_{PCC}i_d \Rightarrow \Delta P = i_d \Delta V_{PCC} + V_{PCC}\Delta i_d \qquad (5)$$

Figure 2:
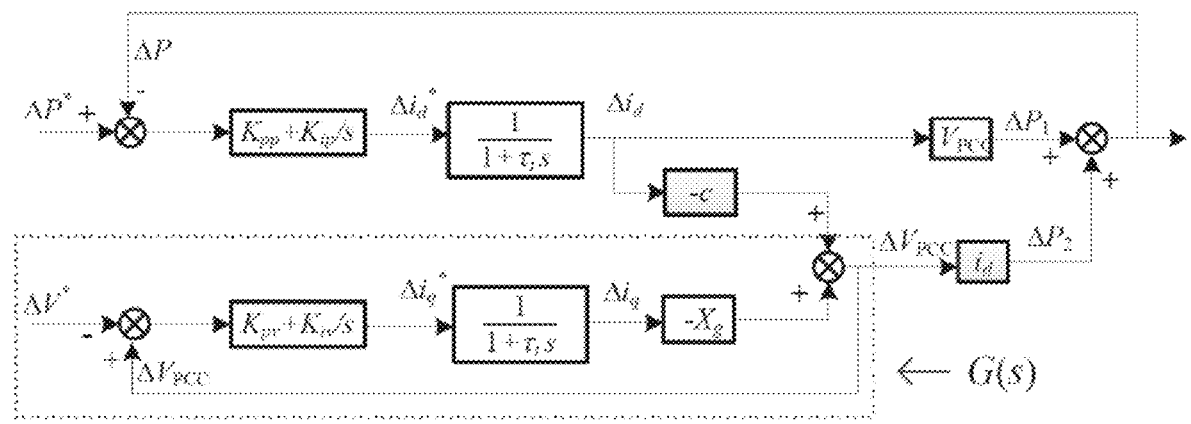
FIG. 2 is a block diagram of a linear system.

The entire system's linear model including the circuit and vector control can be seen in FIG. 2. When the grid is strong and the impact of $\Delta i_d$ to $\Delta V_{PCC}$ can be ignored (c=0), the system is stable. The circuit path from $\Delta i_d$ to $\Delta V_{PCC}$ and further to $\Delta P_2$ can introduce a destabilizing mechanism. If there is no voltage control, (block G(s)=1), when $ci_d > V_{PCC}$, the system will be unstable. With voltage control employed, block G(s), as seen in FIG. 2, can be described as:

$$G(s) = \frac{1}{1 + X_g\left(K_{pv} + \frac{K_{iv}}{s}\right)\frac{1}{1+\tau_i s}} \qquad (6)$$
$$= \frac{s(1+\tau_i s)}{\tau_i s^2 + (1 + X_g K_{pv})s + X_g K_{iv}}.$$

At the steady state, $G(s \to \infty)=0$. If the bandwidth of block G(s) is high, in a lower frequency range, then G(s) from equation (6) can be equivalent to 0. Faster voltage control can lead to increased bandwidth and be beneficial for stability. Additionally, slower power control is also beneficial for stability. The root locus method can verify that both faster voltage control and slower power control are beneficial to the stability of a power system.

The system in FIG. 2 is decoupled at the power measurement. The open loop system from the power order to power measurement can be expressed as follows:

$$\text{Loop}_1 = \frac{K_{ip}(\tau_p s + 1)}{s}\frac{1}{1+\tau_i s}(V_{PCC} - ci_d G) \qquad (7)$$

wherein $\tau_p = K_{pp}/K_{ip}$.

Figure 3A:
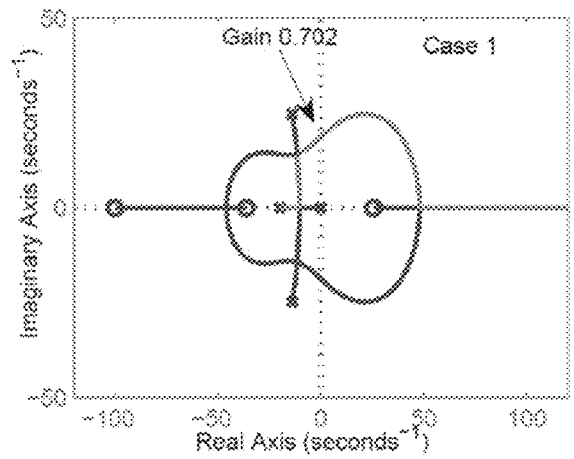
FIG. 3(a) is plot of root loci for a set of voltage control parameters (case 1).
Figure 3B:
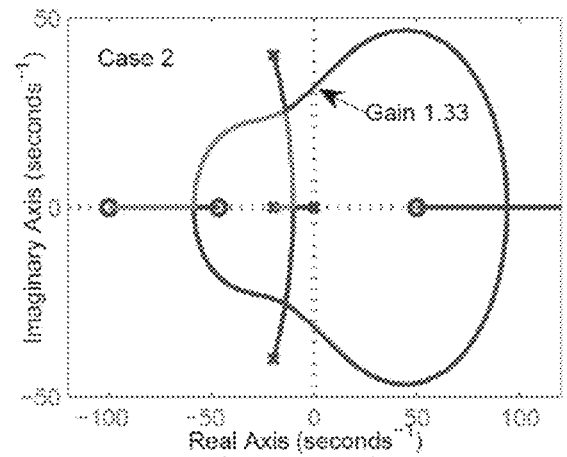
FIG. 3(b) is plot of root loci for a set of voltage control parameters (case 2).

The root loci based on $L_1$ for two sets of voltage control parameters are shown in FIGS. 3(a) and 3(b) where $X_g=1$, $i_d=0.9$, $\tau_i=0.05$, $K_{pp}=0.25$ and $K_{ip}=25$. For case 1, as seen in FIG. 3(a), $(K_{pv}, K_{iv})=(0.4, 40)$ and for case 2, as seen in FIG. 3(b), $(K_{pv}, K_{iv})=(1, 100)$. The root loci plots shown in FIGS. 3(a) and 3(b) show that the system has four loci. FIG. 3(a) shows that for case 1, the system is unstable since the gain is 0.702 when the two loci reach the imaginary axis. When the loop is closed with a unit gain, there can be two closed-loop poles located in the right-half plane (RHP). FIG. 3(b) shows that for case 2, the system is stable due to increased voltage control parameters. From the loci movement trends seen in FIGS. 3(a) and 3(b), it can be found that if the $\tau_p$ is kept the same and the gain of the power control $K_{ip}$ decreases, the closed-loop system can be more stable.

Figure 4A:
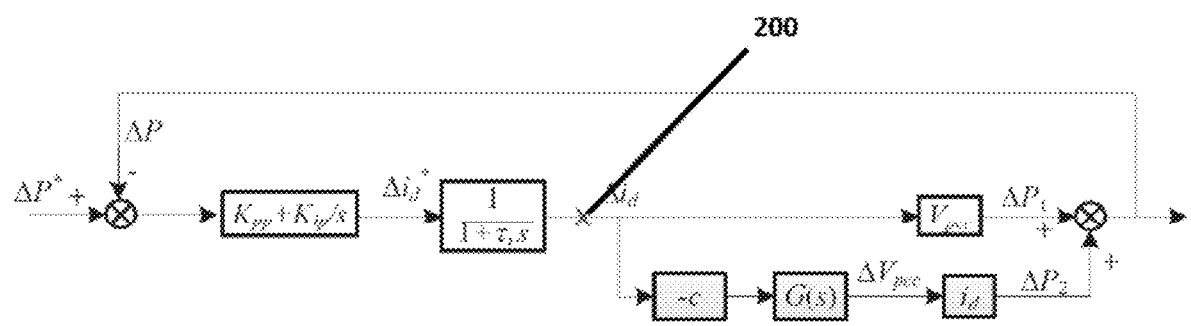
FIG. 4(a) is block diagram of a linear system (system 1).
Figure 4B:
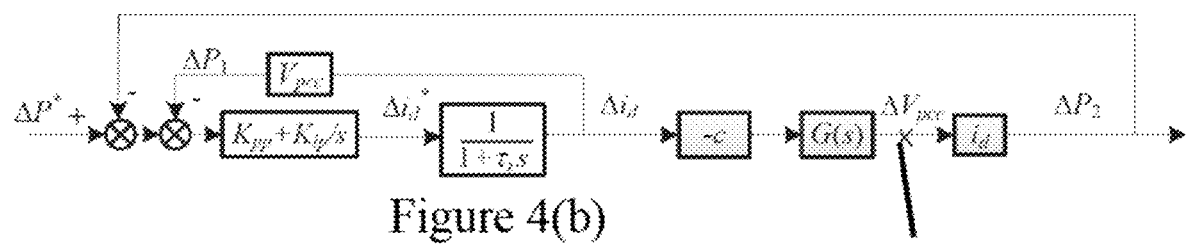
FIG. 4(b) is a block diagram of a linear system (system 2).
Figure 5:
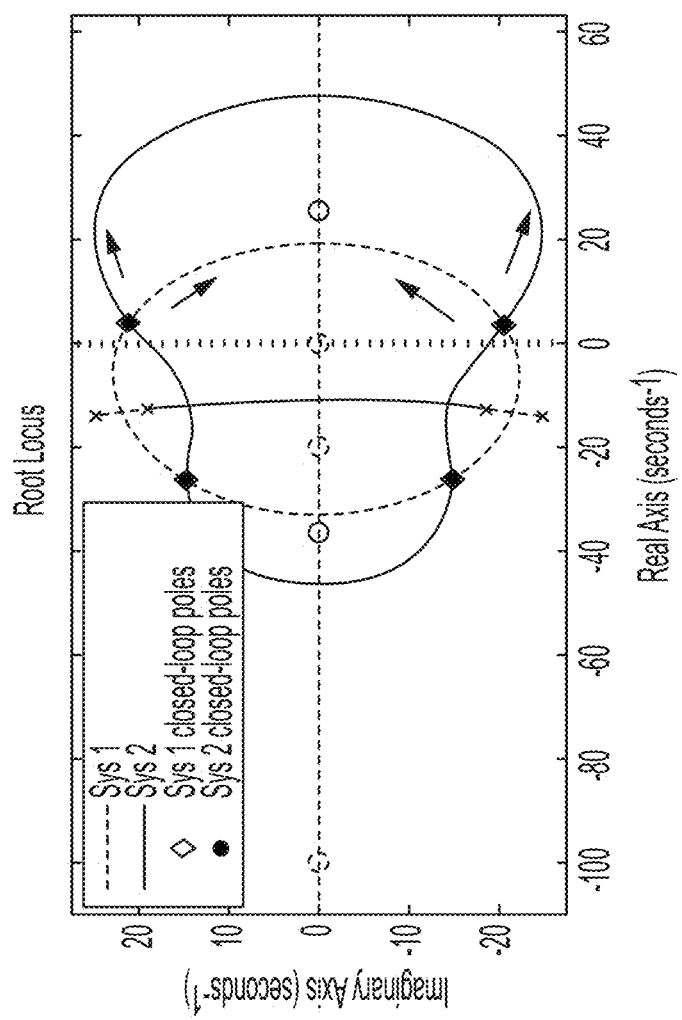
FIG. 5 is a plot of root loci for the systems described in FIGS. 4(a) and 4(b).

FIGS. 4(a) and (b) show block diagrams of two linear systems (system 1 and system 2). The respective open loop circuits of the two systems are obtained by breaking the points marked by the crosses 200 and 210. System 1, as seen in FIG. 4(a), has an open-loop gain equivalent to the expression Loop$_1$ in equation 7. The root loci for the respective loop gains of the two systems are plotted in FIG. 5. For both systems, there are two root loci move to the RHP, which causes instability in each respective system.

Figure 6A:
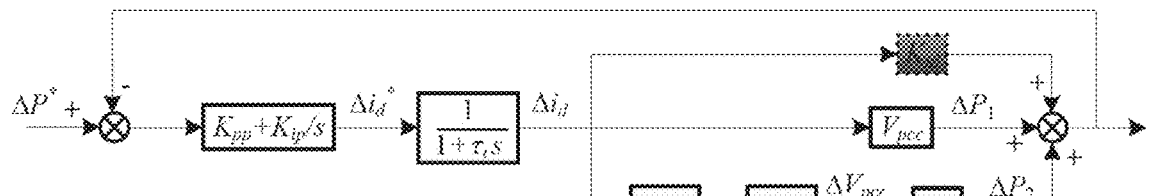
FIG. 6(a) is a block diagram of a linear system with feedback controls, in which $\Delta i_d$ is an input signal.
Figure 6B:
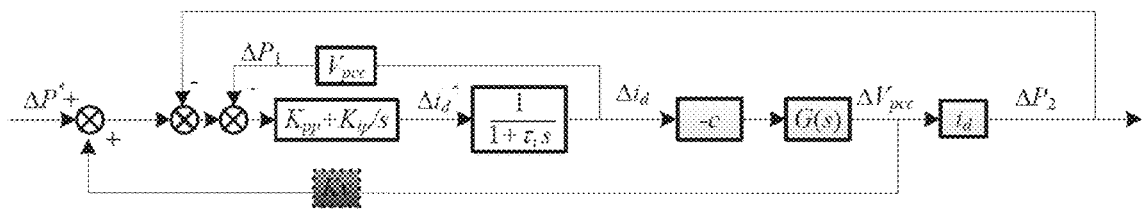
FIG. 6(b) is a block diagram of a linear system with feedback controls, in which $\Delta V_{PCC}$ is an input signal.
Figure 7:
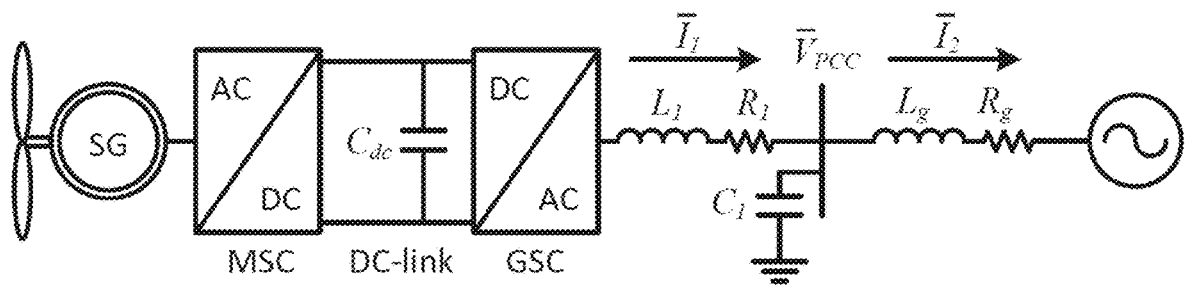
FIG. 7 is a circuit diagram for an analytical model.

FIGS. 4(a) and (b) show respective block diagrams of two linear systems. Two feedback control configurations can suppress the effect of $\Delta V_{PCC}$ on real power, $\Delta P$. The first strategy is to modulate the power order using the d-axis current. The effect is the same as increasing $V_{PCC}$, which is the gain from $\Delta i_d$ to $\Delta P_1$. A second strategy is to modulate the power order using the PCC voltage $\Delta V_{PCC}$. The effect is the same as decreasing $i_d$, the gain from $\Delta V_{PCC}$ to $\Delta P_2$. FIGS. 6(a) and 6(b) show block diagrams of the two above-referenced feedback control methods.

The coupling between power and voltage can be suppressed by introducing feedback control to modulate the power order or the dc-link voltage order for vector control-based grid-side converters. Input signals can be either the d-axis converter current or the PCC voltage. The feedback control is implemented in both analytical models and detail model-based MATLAB/SimPowerSystems Type-3 and Type-4 wind testbeds. The analytical models verify that the feedback control can improve weak grid power system operation for VSCs in both power control and dc-link voltage control modes. The MATLAB/SimPowerSystems testbeds demonstrate that the PCC voltage-based control can significantly improve operation margins for both Type-3 and Type-4 wind farms.

Figure 8A:
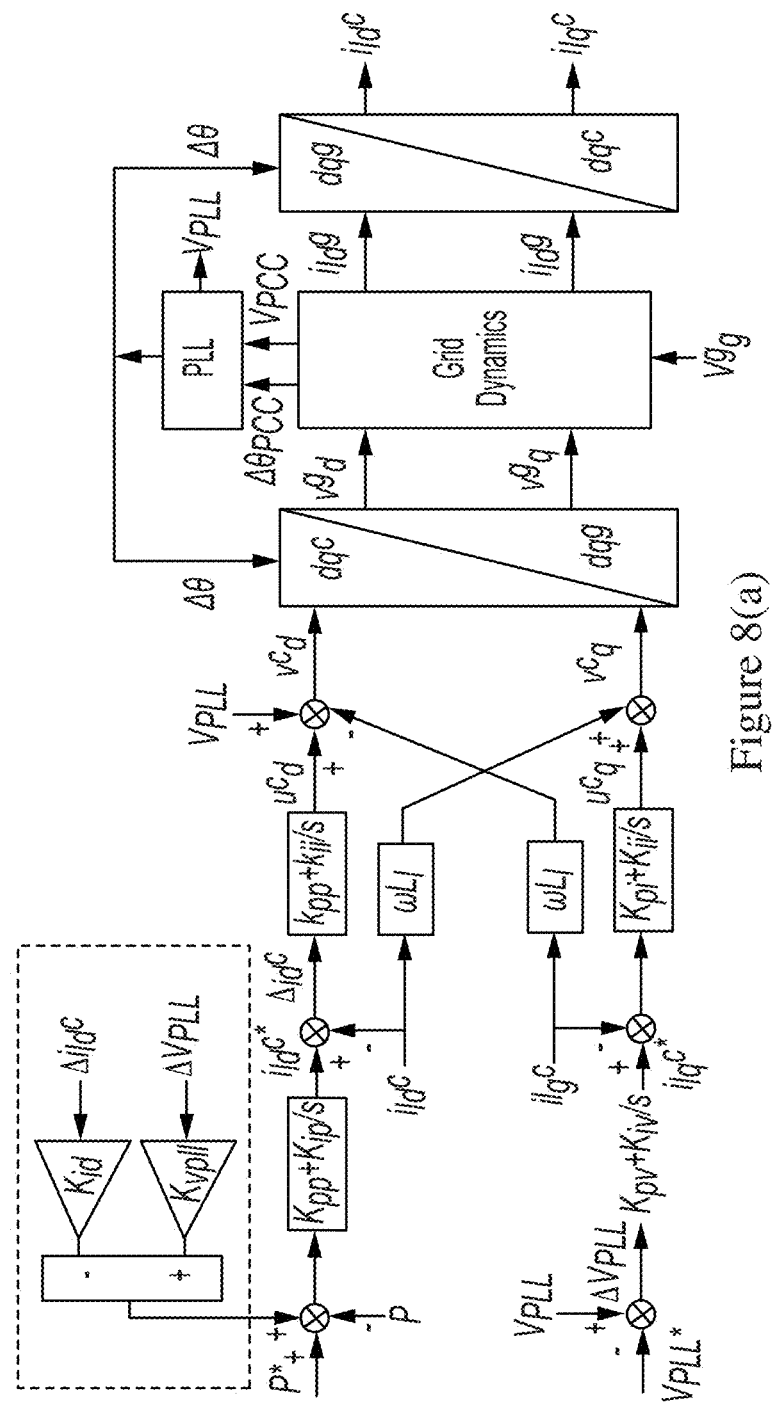
FIG. 8(a) is a block diagram illustrating a control method implementation (Model 1).
Figure 8B:
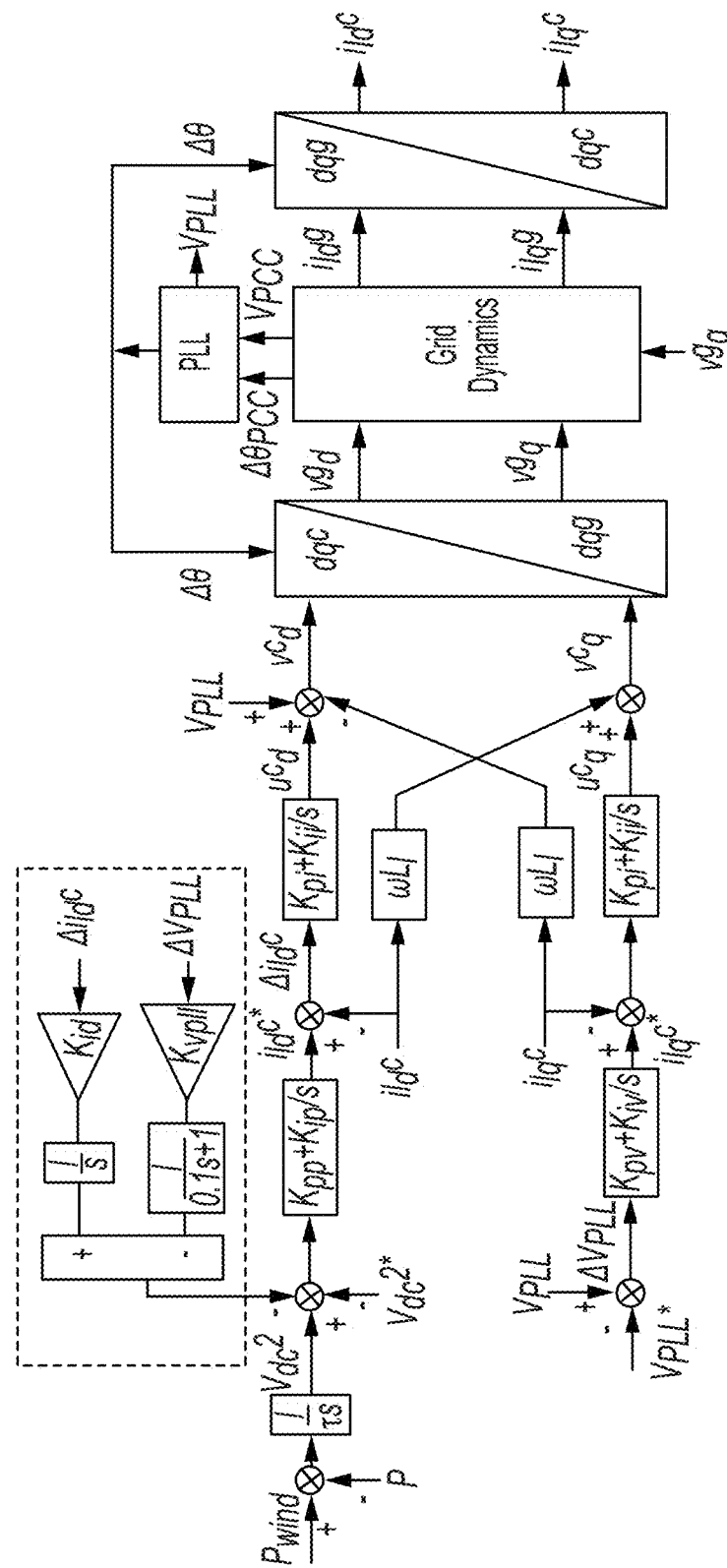
FIG. 8(b) is a block diagram illustrating a control method implementation (Model 2).

FIGS. 8(a) and 8(b) show block diagram of a system with a grid-side converter (GSC) in active power mode and ac voltage control mode, respectively. FIG. 8(a) also includes the dynamics of phase-locked-loop (PLL), inner current control, and the grid dynamics. The grid dynamics block uses the grid reference frame, whose d-axis is aligned with the grid voltage; while each of the converter control blocks use the converter reference frame whose d-axis is aligned with the PCC voltage.

Either the PCC voltage measured by PLL $\Delta V_{pll}$ or the converter d-axis current $\Delta i_{id}$ can be used to modulate the real power order. The output of a proportional control method using $\Delta V_{pll}$ as an input signal is added to the real power order. The output of the proportional control method using $\Delta i_{id}$ as an input is subtracted from the real power order.

The performance of the feedback control can be analyzed based on the eigenvalue loci generated from the analytical model (Model 1). Because the analytical model is nonlinear, an initialization procedure is required to perform a flat run. At the steady state, the output from the stability control power is zero. The parameters used in the analytical model are listed in Table I.

TABLE I

Parameters of Model 1 and Type-3 wind testbed

| Parameter | Value (SI) | Per-unit (pu) |
|---|---|---|
| # of WT | 60 | |
| Rated power | 1.5 MW | 0.9 |
| DC-link voltage | 1150 V | |
| Rated voltage | 575 V | 1 |
| Nominal freq. | 60 Hz | 1 |
| $L_{ls}(X_{ls})$, $R_s$ | 94.5 µH, 5.6 mΩ | 0.18, 0.023 |
| $L'_{lr}(X'_{lr})$, $R'_r$ | 84.0 µH, 3.9 mΩ | 0.16, 0.016 |
| $L_m(X_m)$ | 1.5 mH | 2.9 |
| Inertial, poles | 8.03 J, 6 | |
| Friction factor | 0.01 | |
| $C_{dc}$ | 10 mF | |
| $L_c(X_c)$, $R_c$ | 0.16 mH, 0.59 mΩ | 0.3, 0.03 |
| $C_1(B_1)$ | 2.9 mF | 0.267 |
| $L_{T1}(X_{T1})$, $R_{T1}$ | 0.165 mH, 6.25 mΩ | 0.02, 0.002 |
| $L_{T2}(X_{T2})$, $R_{T2}$ | 19.25 mH, 725 mΩ | 0.03, 0.003 |
| $L_2(X_2)$ | 0.58 → 1.35 H | 0.45 → 1.05 |
| $R_2$ | 21.78 → 50.82 Ω | 0.045 → 0.105 |
| Current control | $K_{pi}$ = 0.6, $K_{ii}$ = 8, pu | |
| Power control | $K_{pp}$ = 0.4, $K_{ip}$ = 40, pu | |
| Voltage control | $K_{pv}$ = 0.25, $K_{iv}$ = 25, pu | |
| PLL | $K_{pPLL}$ = 60, $K_{iPLL}$ = 1400, pu | |

Figure 9A:
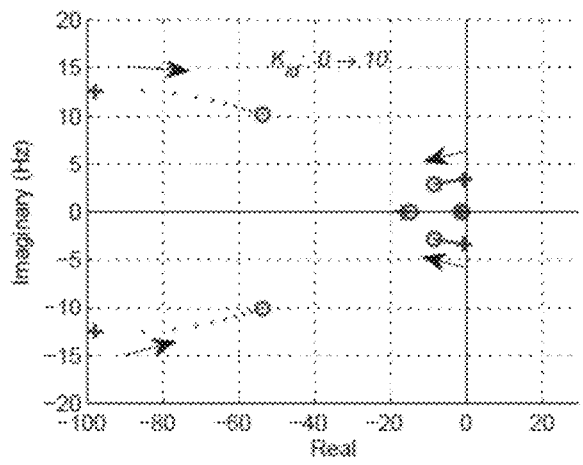
FIG. 9(a) is a plot of Eigenvalue loci for a system, wherein P=0.9, $V_{PCC}$=1, $K_{id}$ increases from 0 to 10 with $X_g$=0.88 pu.
Figure 9B:
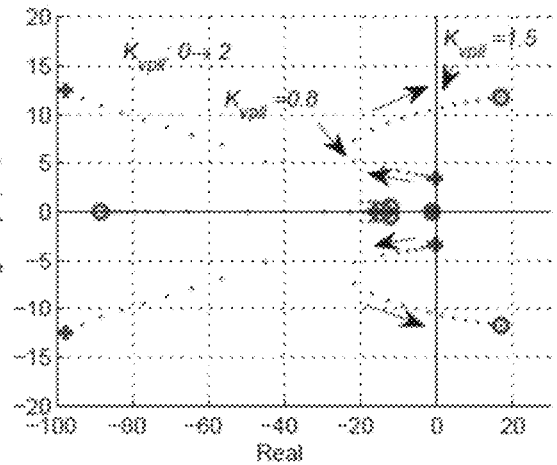
FIG. 9(b) is a plot of Eigenvalue loci for a system, wherein P=0.9, $V_{PCC}$=1, $K_{vpll}$ increases from 0 to 2 with $X_g$=0.88 pu.
Figure 9C:
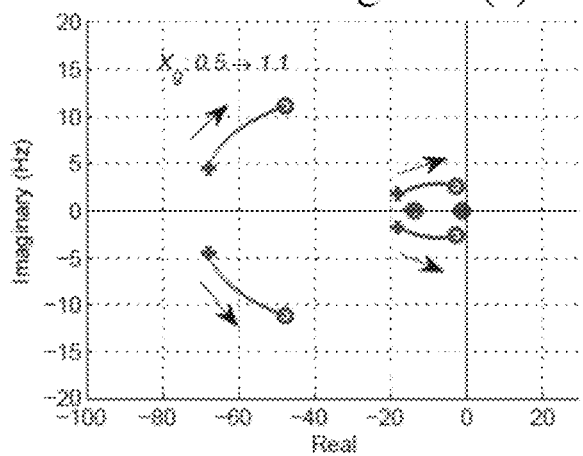
FIG. 9(c) is a plot of Eigenvalue loci for a system, wherein P=0.9, $V_{PCC}$=1, $X_g$ increases with $K_{id}$=10.
Figure 9D:
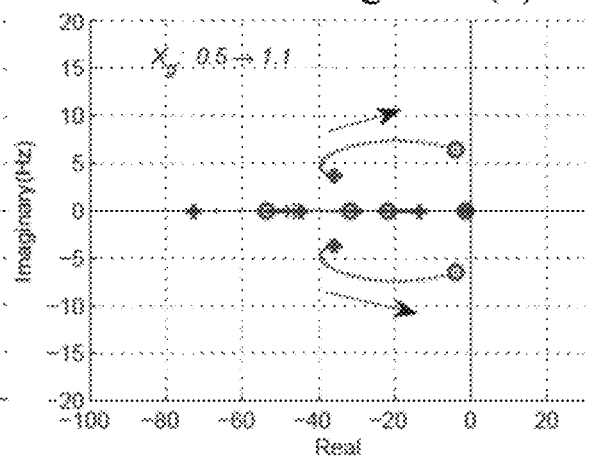
FIG. 9(d) is a plot of Eigenvalue loci for a system, wherein P=0.9, $V_{PCC}$=1, $X_g$ increases with $K_{vpll}$=0.9.

The system is assumed to operate at 0.9 pu power and the PCC voltage is set at 1 pu. Eigenvalue loci are plotted in FIGS. 9(a)-9(d) show the effect of feedback gains for a VSC in power and ac voltage (PV) control mode. For PV control, the marginal stable condition is $X_g$=0.86 pu. FIGS. 9(a) and 9(b) show how the different values of $K_{id}$ or $K_{vpll}$ affect the system stability wherein $X_g$=0.88 pu. FIGS. 9(c) and 9(d) show the eigenvalue loci and $X_g$ increasing wherein the control gain $K_{id}$ or $K_{vpll}$ is fixed.

Figure 10A:
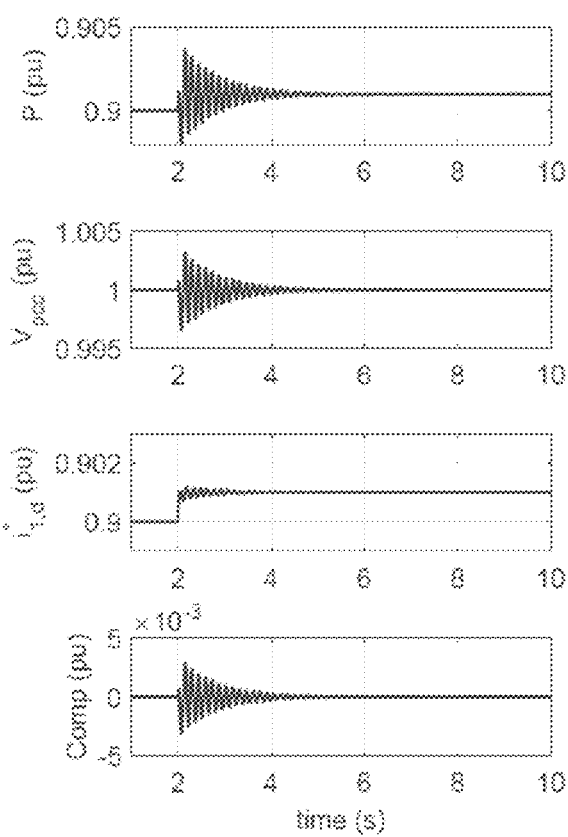
FIG. 10(a) shows plots of time-domain results wherein $K_{vpll}$=0.9, $X_g$=1.1 pu, P=0.9 pu.
Figure 10B:
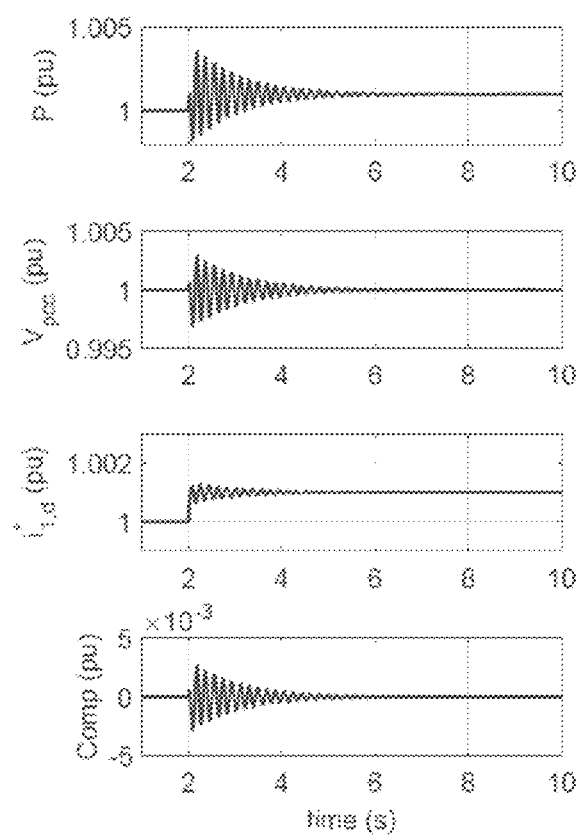
FIG. 10(b) shows plots of time-domain results wherein $K_{vpll}$=0.9, $X_g$=1.0 pu and P=1.0 pu.

In control design, a small gain is preferred to avoid reaching system limits. A current-based stability control requires a larger gain than voltage-based stability control. FIG. 9(d) demonstrates that with the voltage-based stability controller ($K_{vpll}$=0.9), the system is stable even when $X_g$ increases to 1.1 pu. FIGS. 10(a) and 10(b) present the time-domain responses from the analytical model (Model 1) with a small disturbance (0.001 pu increment in the power order) at t=2 s. Using a PCC voltage-based control method, a wind farm can transfer 1 pu power to a weak grid power system with a short circuit ratio (SCR) at 1.

Stability control can be implemented to modulate the dc-link voltage reference instead of the power order if the VSC is in dc-link voltage control mode. To have a similar effect as modulating the power order, an integrator can be used. Experiments show that modulating the dc-link voltage reference with the output from an integrator control with PCC voltage input can lead to increase or reduction of the dc-link voltage at the steady state. Therefore, a high pass filter (HPF)

$$\left(\frac{s}{0.1s+1}\right)$$

can be used after the integrator to filter out the dc component. Combining the integrator 1/s and the HPF can be equivalent to a low pass filter (LPF)

$$\left(\frac{1}{0.1s+1}\right).$$

This control implementation is presented in FIG. 8(b).

Figure 11:
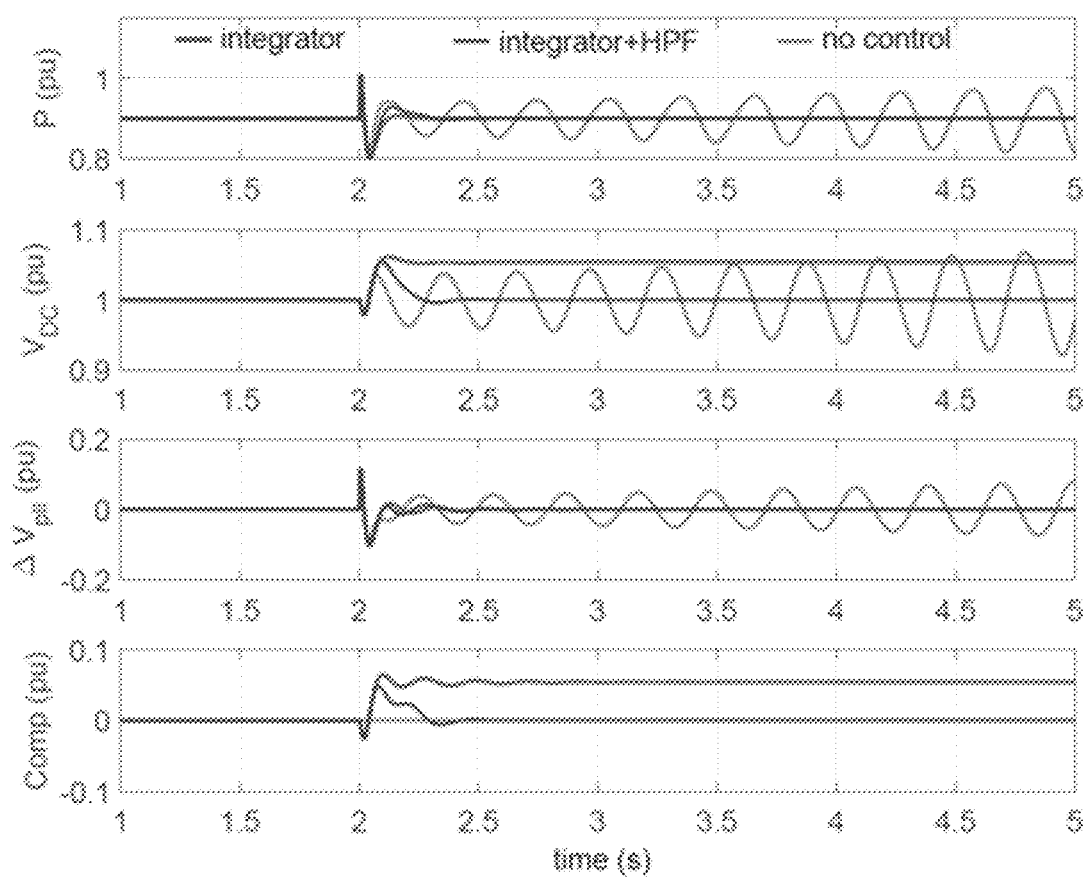
FIG. 11 shows plots illustrating a comparison of dynamic responses with and without the high pass filter (HPF), wherein $X_g$: 0.5→0.61.

FIG. 11 shows plots of the different dynamic responses of the system (Model 2): (a) without voltage-based stability control, (b) with an integrator-based voltage feedback control, and (c) with an additional HPF. The responses are the output power, dc-link voltage, $\Delta V_{pll}$, and the output of the stability control or compensation on $V_{DC}$. Although the integrator-based feedback control of $\Delta V_{pll}$ can improve the stability of the system, a dc component is added to the dc-link voltage order at the steady state. By adding the HPF, the dc component can be eliminated.

Figure 12A:
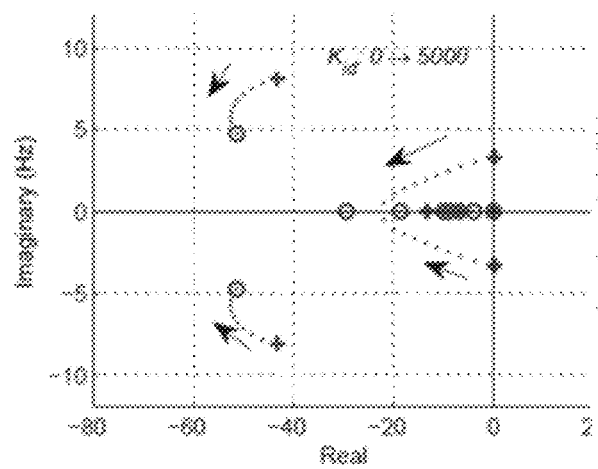
FIG. 12(a) is a plot of Eigenvalue loci for a system with dc-link voltage control, wherein $K_{id}$ increases from 0 to 5000 with $X_g$=0.61 pu.
Figure 12B:
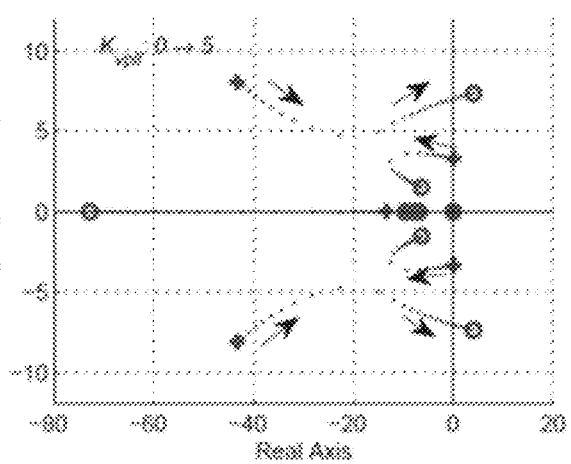
FIG. 12(b) is a plot of Eigenvalue loci for a system with dc-link voltage control, wherein $K_{vpll}$ increases from 0 to 5 with $X_g$=0.61 pu.
Figure 12C:
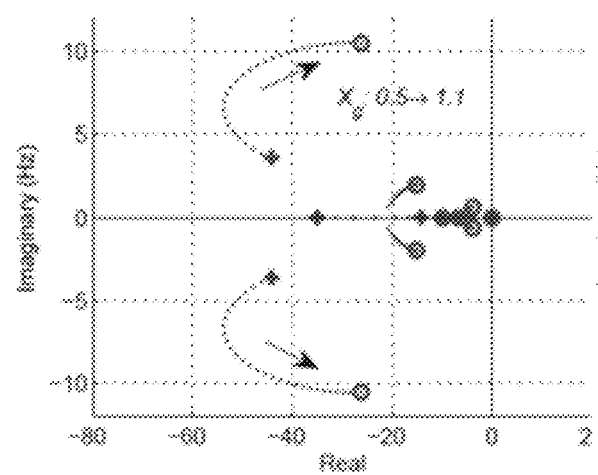
FIG. 12(c) is a plot of Eigenvalue loci for a system with dc-link voltage control, wherein $X_g$ increases with $K_{id}$=4000.
Figure 12D:
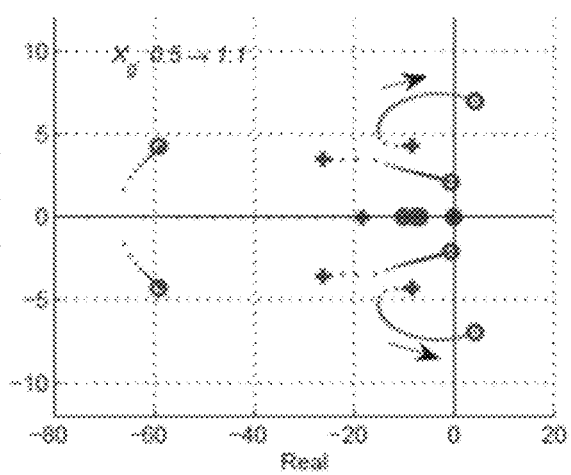
FIG. 12(d) is a plot of Eigenvalue loci for a system with dc-link voltage control, wherein $X_g$ increases with $K_{vpll}$=2.

The eigenvalue loci for the system (Model 2), as seen in FIG. 8(b), are plotted in FIGS. 12(a)-12(d). The marginal stable condition for a VSC in dc-link voltage control mode is $X_g$=0.6 pu. The upper two plots FIG. 12(a) and FIG. 12(b) show that the effect of the gain of the stability controller $K_{id}$ or $K_{vpll}$ wherein $X_g$=0.61 pu. FIGS. 12(c) and 12(d) show the closed-loop system eigenvalues for a varying $X_g$ with a fixed controller gain ($K_{id}$=4000, or $K_{vpll}$=2).

It can be seen that the stability control can enhance the system stability. In addition, for VSCs in dc-link voltage control mode, the gain required for the current-based stability control is very large. FIG. 12(b) shows that when the gain of the voltage-based stability control increases, the critical mode can move to the left-half plane (LHP) while another mode can move to the RHP and that $K_{vpll}$=2 is a suitable gain. FIG. 12(d) demonstrates that the marginal stable condition can be increased to $X_g$=1 pu, wherein $K_{vpll}$=2.

Figure 13A:
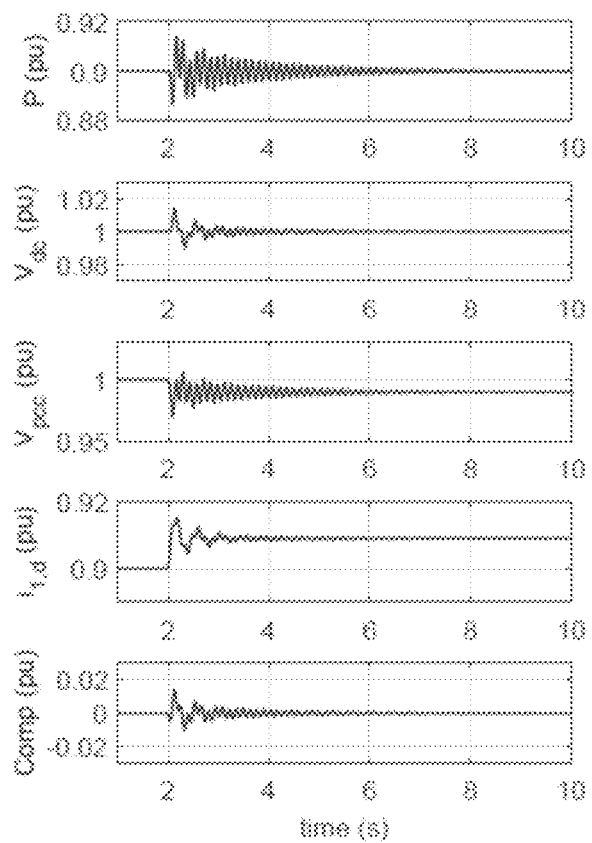
FIG. 13(a) is a plot of time-domain results, wherein $K_{vpll}$=2, $X_g$=1.01 pu, P=0.9 pu.
Figure 13B:
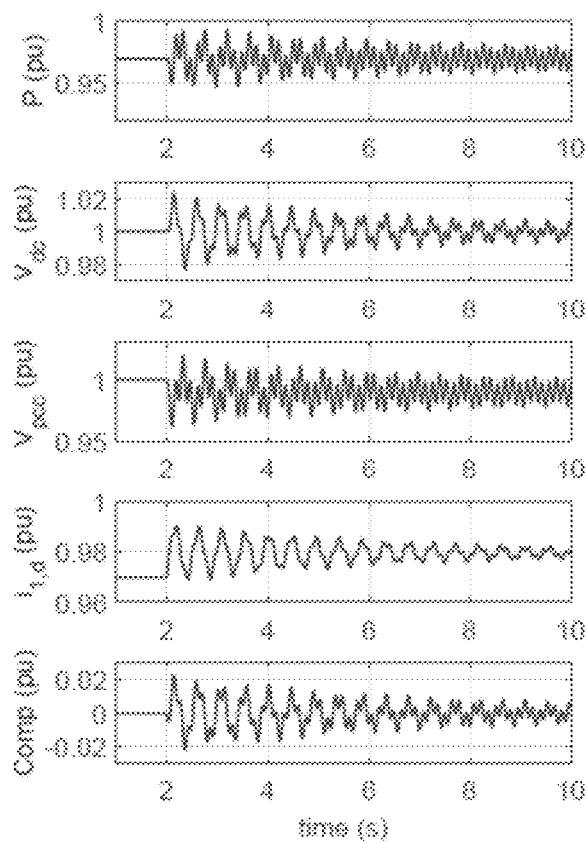
FIG. 13(b) is a plot of time-domain results, wherein $K_{vpll}$=2, $X_g$=1 pu and P=0.97 pu.

FIGS. 13(a) and 13(b) present the time-domain responses from the analytical model (Model 2) with a small disturbance (0.01 pu reduction in ac voltage order) at t=2 s. With the PCC voltage-based stability control, the wind farm can transfer more than 0.9 pu power to a very weak grid power system (SCR=1). It can be seen when P=0.97 and $X_g$=1, the system has two oscillation frequencies, one at 7 Hz and the other at 2 Hz. The time-domain simulation results corroborate with the eigenvalue analysis in FIG. 12(d) where two modes, one at 7 Hz and the other at 2 Hz, move towards the RHP when the grid becomes weaker.

Figure 14A:
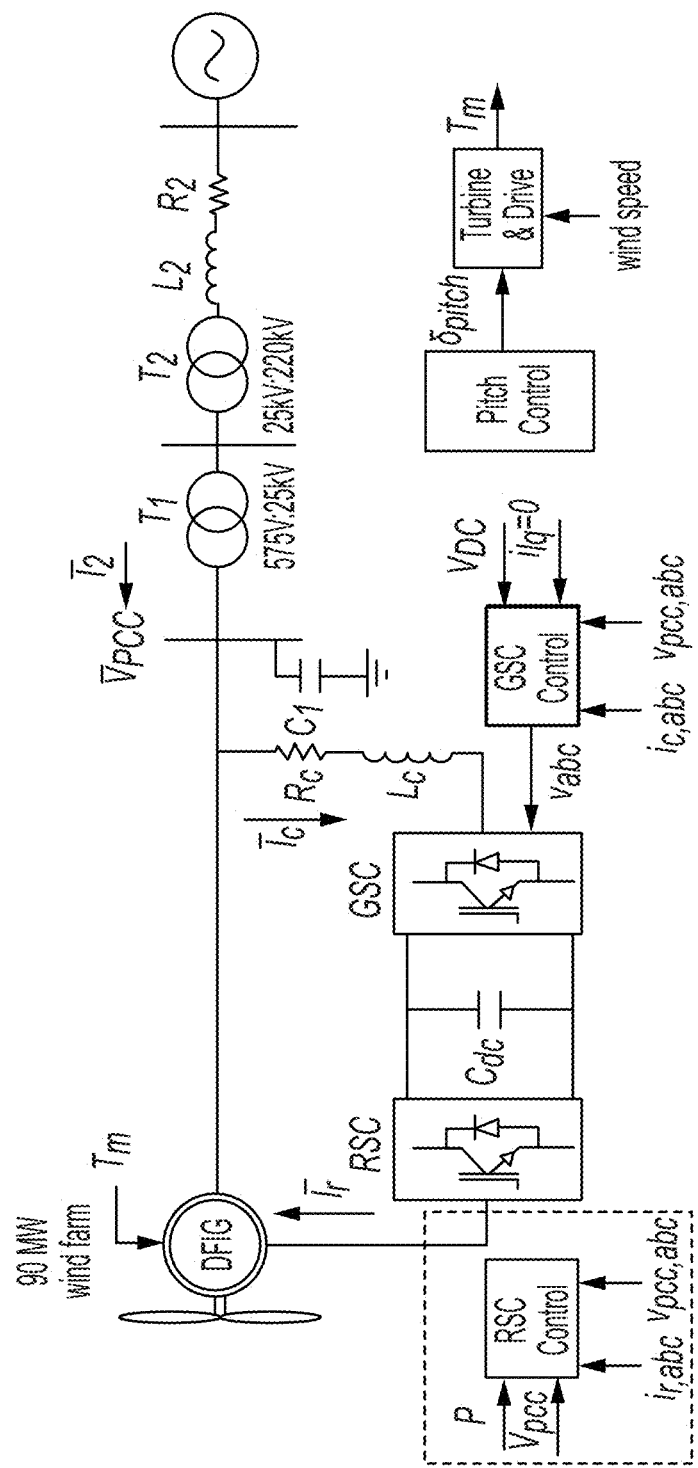
FIG. 14(a) is a diagram illustrating a MATLAB/SimPowerSystems testbed showing a 90 MW Type-3 wind farm connected to a grid through a long transmission line.
Figure 14B:
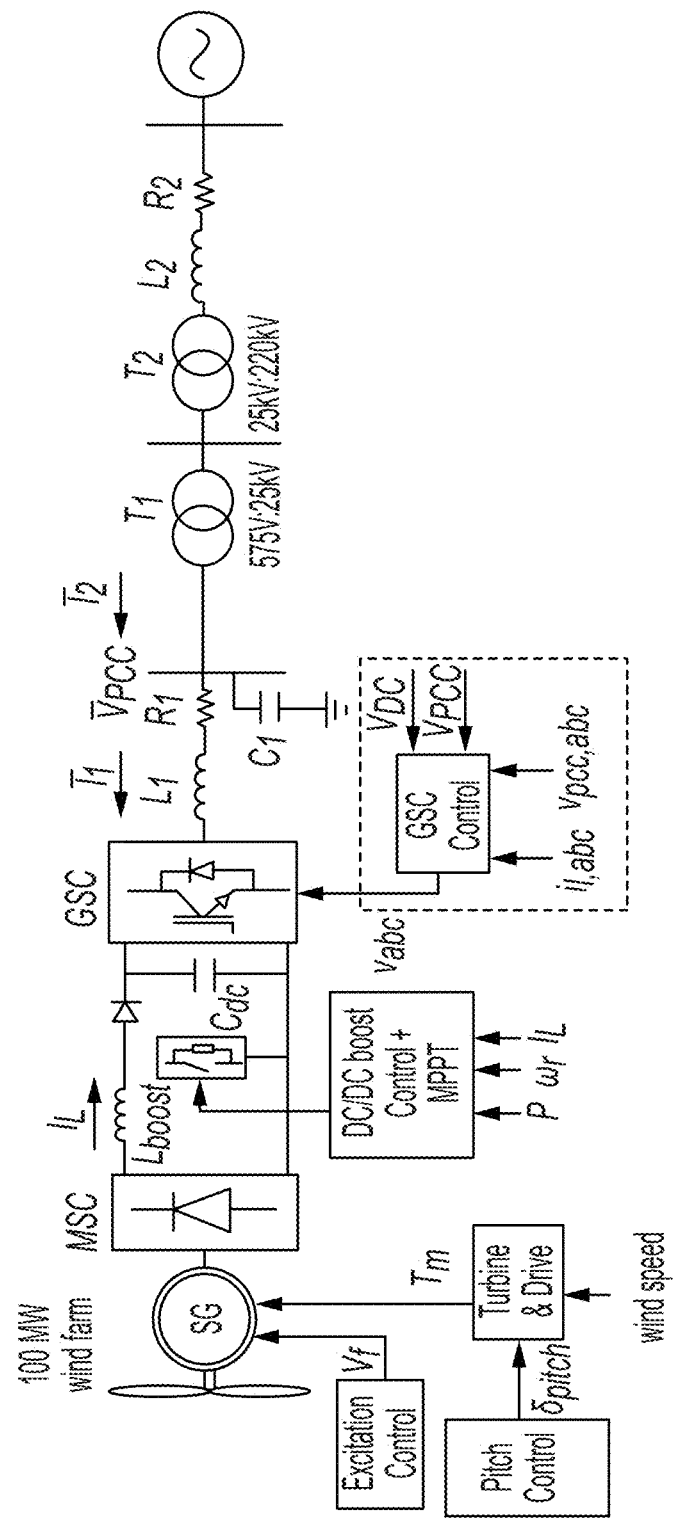
FIG. 14(b) is a diagram illustrating a MATLAB/SimPowerSystems testbed showing a 100 MW Type-4 wind farm connected to a grid through a long transmission line.

Final stage validation was carried out in two testbeds in MATLAB/SimPowerSystems. The testbeds aligned with the real-world system with full dynamics and converter limitations. The two testbeds were based on the demo testbeds of Type-3 wind and Type-4 wind in SimPowerSystems. The topologies of Type-3 and Type-4 wind testbeds are shown in FIGS. 14(a) and 14(b). The Type-3 wind rotor-side converter (RSC) was operated in power control mode. As the majority of power was delivered through a RSC, the Type-3 wind testbed was viewed similar to Model 1. The Type 4 wind's GSC was operated in dc-link voltage control mode and viewed similar to Model 2.

Both of wind farms were connected to the grid through respective 220 kV long transmission lines. The respective parameters of the two testbeds are listed in Table I and Table II.

TABLE II

Parameters of Model 2 and Type-4 wind testbed

| Parameter | Value (SI) | Per-unit (pu) |
|---|---|---|
| # of WT | 50 | |
| Rated power | 2 MW | 0.9 |
| DC-link voltage | 1100 V | |
| Rated voltage | 575 V | 1 |
| Nominal freq. | 60 Hz | 1 |
| $X_d$, $X_q$ | 313 mΩ, 114 mΩ | 1.305, 0.474 |
| $X'_d$ | 71.0 mΩ | 0.296 |
| $X''_d$, $X''_q$ | 60.5 mΩ, 58.3 mΩ | 0.252, 0.243 |
| $R_s$, $X_t$ | 1.44 mΩ, 40.8 mΩ | 0.006, 0.18 |
| $T'_{do}$, $T''_{do}$ | 4.49 s, 0.0681 s | |
| $T''_q$ | 0.0513 s | |
| Inertial, poles | 9.69 J, 2 | |
| Friction factor | 0.01 | |
| $L_{boost}$ | 1.2 mH | |
| $C_{dc}$, T | 90 mF, 0.0272 s | |
| $L_1(X_1)$, $R_1$ | 0.06 mH, 0.45 mΩ | 0.15, 0.003 |
| $C_1(B_1)$ | 3.6 mF | 0.203 |
| $L_{T1}(X_{T1})$, $R_{T1}$ | 0.15 mH, 5.65 mΩ | 0.02, 0.002 |
| $L_{T2}(X_{T2})$, $R_{T2}$ | 17.35 mH, 655 mΩ | 0.03, 0.003 |
| $L_2(X_2)$ | 0.52 → 1.21 H | 0.45 → 1.05 |
| $R_2$ | 19.6 → 45.8 Ω | 0.045 → 0.105 |
| Current control | $K_{pi}$ = 0.48, $K_{ii}$ = 3.28, pu | |
| dc control | $K_{pp}$ = 0.4, $K_{ip}$ = 40, pu | |
| Voltage control | $K_{pv}$ = 0.25, $K_{iv}$ = 25, pu | |
| PLL | $K_{pPLL}$ = 60, $K_{iPLL}$ = 1400, pu | |

The testbeds imposed limitations on the respective converter currents. In the Type-3 wind testbed, the limitation of the RSC current was [0 0.9] pu. In the Type-4 wind testbed, the limitation was [−1.1 1.1] pu.

In the Type-3 wind farm, the feedback control loop was implemented in a rotor-side converter (RSC) to change the power order. The wind farm power base was 100 MW, while the rated power output of the wind farm was 90 MW or 0.9 pu. At the steady state, the rotating speed of the rotor was 1.25 pu and the slip value was −0.25. With the total d-axis current from wind at 0.90 pu, the RSC d-axis current was 0.72 pu and the GSC d-axis current was 0.18 pu to the grid.

Figure 15:
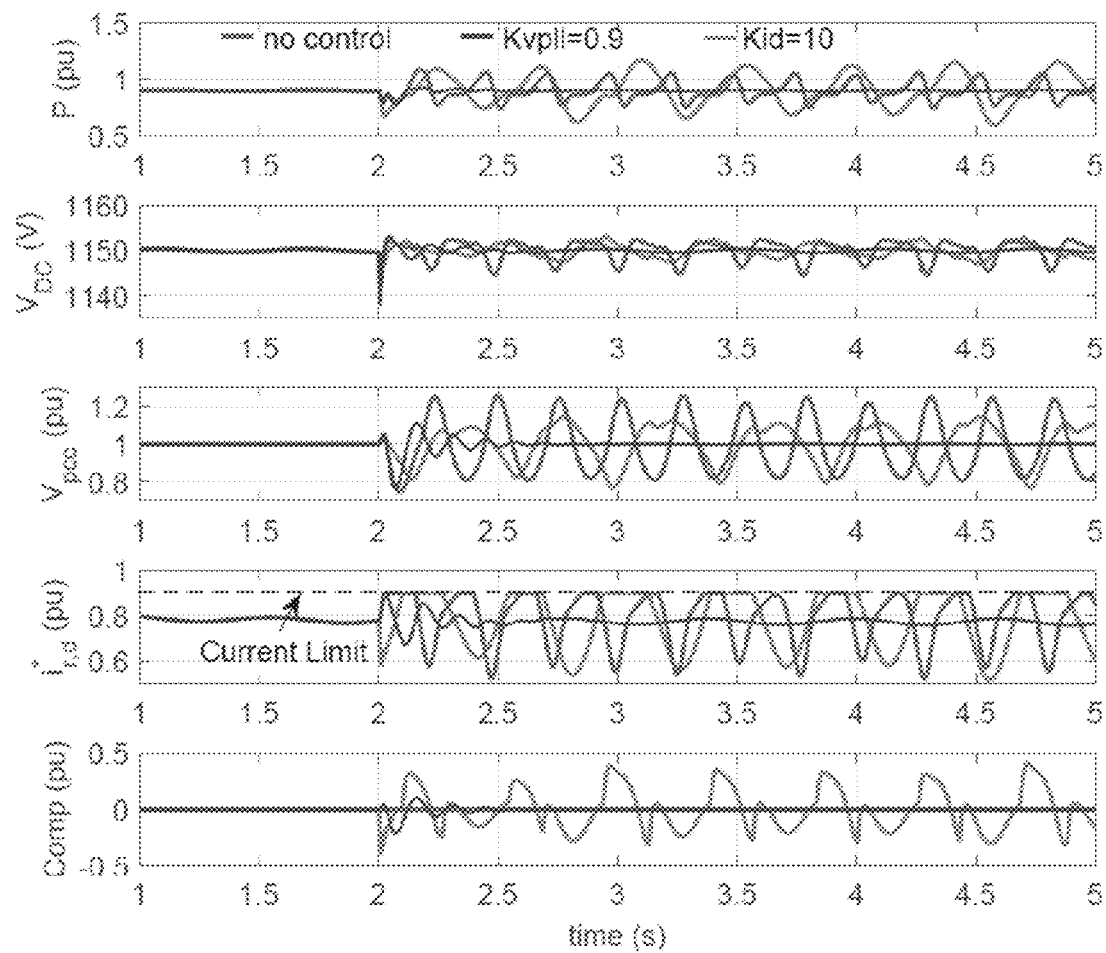
FIG. 15 shows plots of Type-3 wind testbed simulation results: $X_g$: 0.5→0.88 at 2 sec. Red line: no control; Blue line: voltage-based control ($K_{id}$=0, $K_{vpll}$=0.9); Green line: current-based control ($K_{id}$=10, $K_{vpll}$=0).

FIG. 15 presents wind output power P, dc-link voltage $V_{DC}$, PCC voltage $V_{PCC}$, RSC d-axis current order $i^*_{r,d}$, and the output from the stability control compensation for three scenarios: (a) without control, with either (b) voltage-based control ($K_{vpll}$=0.9) or (c) current-based control ($K_{id}$=10). At t=2 seconds, $X_g$ changed from 0.5 pu to 0.88 pu to emulate a parallel line tripping event.

Without stability control, the system suffered 3 Hz oscillations. This performance aligns with the eigenvalue analysis presented in FIGS. 9(a) and 9(b). When the gain of the stability controller was 0, the system was at the marginal stability condition and the oscillation frequency was 3 Hz.

Figure 16:
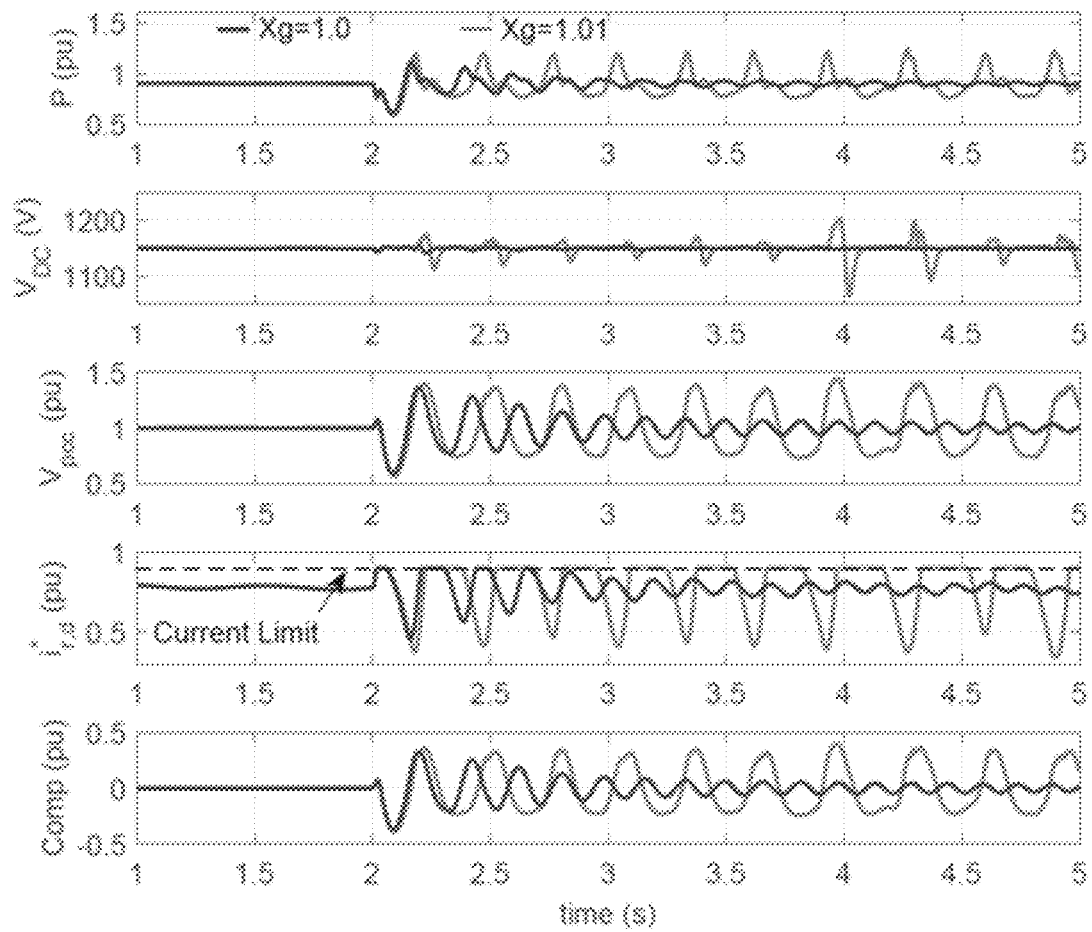
FIG. 16 shows plots of Type-3 wind testbed results: with $K_{vpll}$=0.9, $X_g$: 0.5→1.0 (blue line) and $X_g$: 0.5→1.01 (green line).

The system operating limit increases with voltage-based control. FIG. 16 presents the dynamic responses of the system when $X_g$=1.0 pu and 1.01 pu. The system was stable when $X_g$=1 pu and unstable when $X_g$=1.01.

Figure 17:
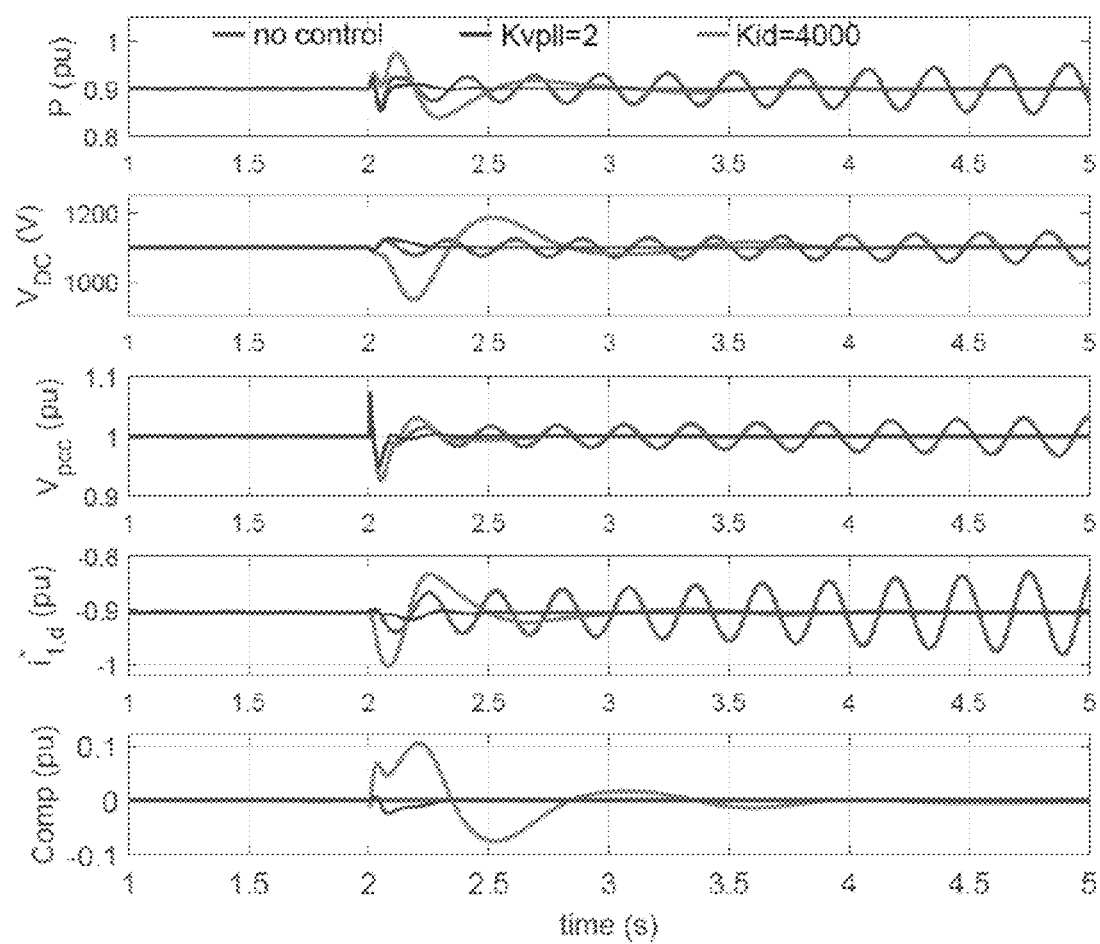
FIG. 17 shows plots of Type-4 testbed results: $X_g$: 0.5→0.61 at 2 sec. Red line: no control; Blue line: voltage-based control ($K_{id}$=0, $K_{vpll}$=2); Green line: current-based control ($K_{id}$=4000, $K_{vpll}$=0).

The power base of the Type-4 wind was 110 MW and the rated power was 100 MW or 0.9 pu. For Type-4 wind, the feedback control was implemented in a GSC to modulate the $V_{DC}$ order. In the first case study, the system dynamic responses without control, with voltage or current-based control were compared. $X_g$ was increased from 0.5 pu to 0.61 pu at 2 seconds to emulate a parallel transmission line tripping event. FIG. 17 shows plots of the dynamic responses of P, $V_{DC}$, $V_{PCC}$, $i^*_{1d}$ and the stability controller output compensation for three scenarios: (a) without control, with (b) voltage-based and (c) current-based control.

Without stability control, 3 Hz oscillations appeared after the dynamic event. Both of the voltage-based and current-based control methods made the system stable. The voltage-based control ($K_{pll}$=2) had shorter transients and lower overshoot than the current-based control ($K_{id}$=4000).

Figure 18:
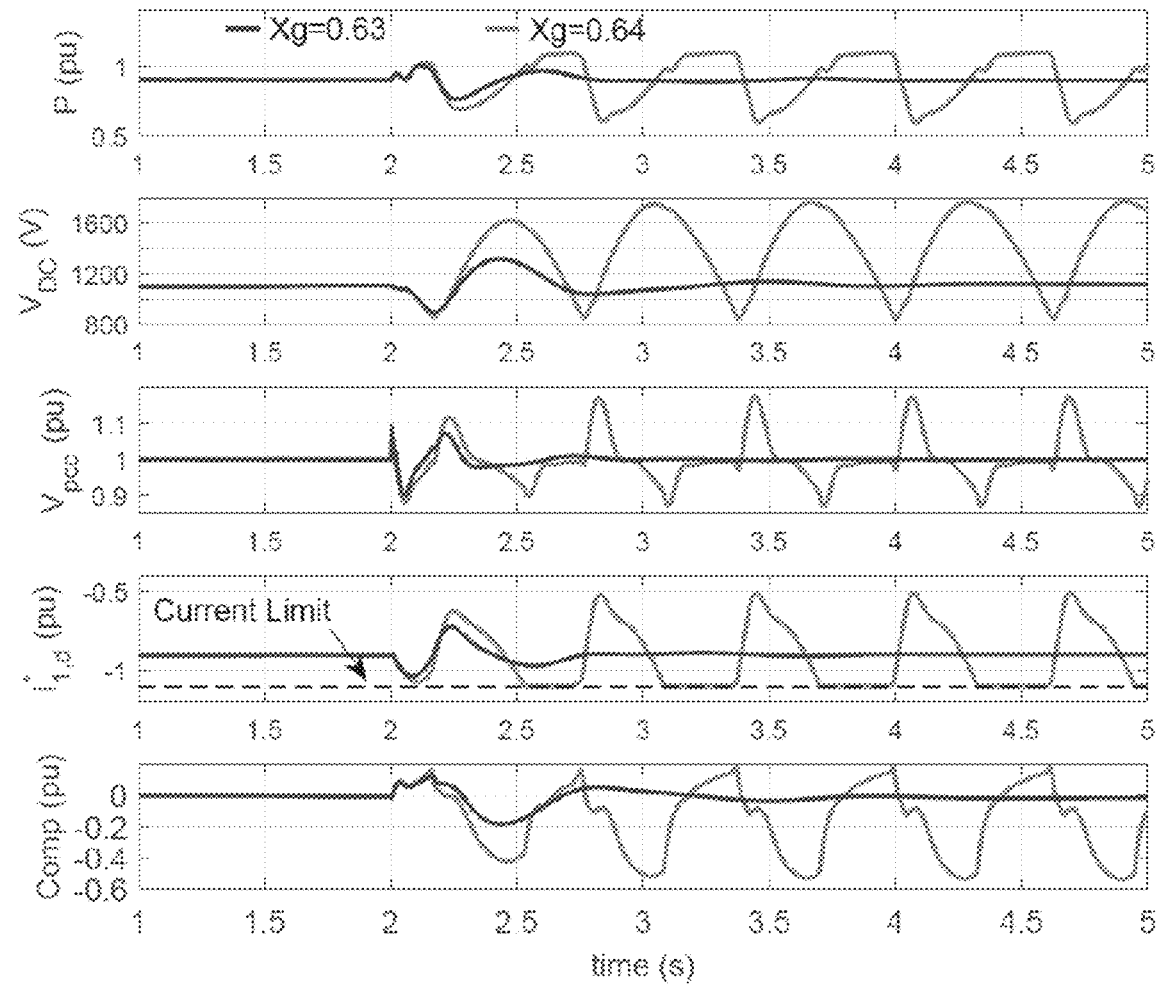
FIG. 18 shows plots of Type-4 wind testbed results: with $K_{id}$=4000, $X_g$: 0.5→0.63 (blue line), $X_g$: 0.5→0.64 (green line).
Figure 19:
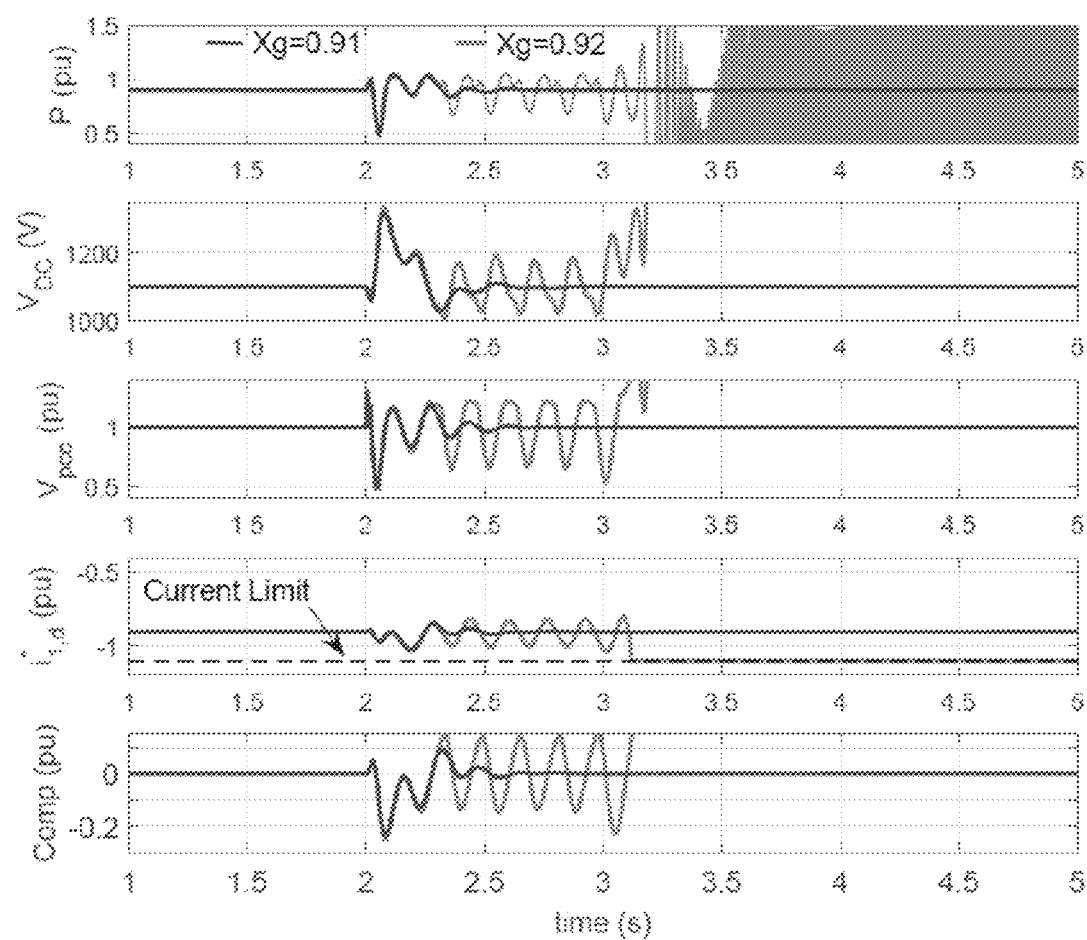
FIG. 19 shows plots of Type-4 wind testbed results: with $K_{vpll}$=2, $X_g$: 0.5→0.91 (blue line), $X_g$: 0.5→0.92 (green line).

The system operating limits were examined with stability control equipped. The values of $K_{id}$ and $K_{vpll}$ were set to 4000 and 2, respectively. FIG. 18 shows plots of the dynamic responses of the system with current-based control for two large disturbances: $X_g$: 0.5→0.63 and $X_g$: 0.5→0.64. Because of the large overshoot, the current-based control ($K_{id}$=4000) makes the converter current order reach its limits. The marginal stable condition changed from $X_g$=0.6 pu to 0.63 pu. FIG. 19 shows plots of the dynamic responses of the system with voltage-based control ($K_{vpll}$=2) for two large disturbances: $X_g$: 0.5→0.91, Xg: 0.5→0.92. It can be observed that the system is stable when $X_g$ reaches 0.91 pu. The marginal stable condition was increased from $X_g$=0.60 pu to 0.91 pu.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof can be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] N. P. W. Strachan and D. Jovcic, "Stability of a variable-speed permanent magnet wind generator with weak ac grids," *IEEE Transactions on Power Delivery*, vol. 25, no. 4, pp. 2779-2788, October 2010.

[2] J. Hu, Y. Huang, D. Wang, H. Yuan, and X. Yuan, "Modeling of grid-connected dfig-based wind turbines for dc-link voltage stability analysis," *IEEE Transactions on Sustainable Energy*, vol. 6, no. 4, pp. 1325-1336, October 2015.

[3] Y. Zhou, D. D. Nguyen, P. C. Kjr, and S. Saylors, "Connecting wind power plant with weak grid—challenges and solutions," in 2013 *IEEE Power Energy Society General Meeting*, July 2013, pp. 1-7.

[4] S. H. Huang, J. Schmall, J. Conto, J. Adams, Y. Zhang, and C. Carter, "Voltage control challenges on weak grids with high penetration of wind generation: Ercot experience," in 2012 *IEEE Power and Energy Society General Meeting*, July 2012, pp. 1-7.

[5] H. Liu, X. Xie, J. He, T. Xu, Z. Yu, C. Wang, and C. Zhang, "Subsynchronous interaction between direct-drive pmsg based wind farms and weak ac networks," *IEEE Transactions on Power Systems*, vol. 32, no. 6, pp. 4708-4720, 2017.

[6] L. Fan and Z. Miao, "An explanation of oscillations due to wind power plants weak grid interconnection," *IEEE trans. Sustainable Energy*, vol. 9, no. 1, pp. 488-490, January 2018.

[7] L. Fan, "Modeling type-4 wind in weak grids," accepted, *IEEE trans. Sustainable Energy*, June 2018.

[8] L. Fan and Z. Miao, "Wind in weak grids: 4 hz or 30 hz oscillations," to appear, *IEEE trans. Power Systems*.

[9] Y. Li, L. Fan, and Z. Miao, "Low-frequency and subsynchronous frequency oscillations in type-4 wind with weak grid interconnections," submitted, *IEEE trans. Power Systems*.

[10] A. Dissanayaka, J. Wiebe, and A. Isaacs. (2018, March) Panhandle and South Texas Stability and System Strength Assessment. Electranix.

[11] B. Wu, Y. Lang, N. Zargari, and S. Kouro, *Power conversion and control of wind energy systems*. John Wiley & Sons, 2011, vol. 76.

[12] X. Yuan, F. Wang, D. Boroyevich, Y. Li, and R. Burgos, "Dc-link voltage control of a full power converter for wind generator operating in weakgrid systems," *IEEE Transactions on Power Electronics*, vol. 24, no. 9, pp. 2178-2192, September 2009.

[13] H. T. Ma, P. B. Brogan, K. H. Jensen, and R. J. Nelson, "Subsynchronous control interaction studies between full-converter wind turbines and series-compensated ac transmission lines," in 2012 *IEEE Power and Energy Society General Meeting*, July 2012, pp. 1-5.

[14] L. Zhang, L. Harnefors, and H. P. Nee, "Power-synchronization control of grid-connected voltage-source converters," *IEEE Transactions on Power Systems*, vol. 25, no. 2, pp. 809-820, May 2010.

[15] J. Alipoor, Y. Miura, and T. Ise, "Power system stabilization using virtual synchronous generator with alternating moment of inertia," *IEEE Journal of Emerging and Selected Topics in Power Electronics*, vol. 3, no. 2, pp. 451-458, 2015.

[16] K. Givaki, D. Chen, and L. Xu, "Current error based compensations for vsc current control in weak grid for wind farm applications," *IEEE Transactions on Sustainable Energy*, pp. 1-1, 2018.

[17] A. Egea-Alvarez, S. Fekriasl, F. Hassan, and O. Gomis-Bellmunt, "Advanced vector control for voltage source converters connected to weak grids," *IEEE Transactions on Power Systems*, vol. 30, no. 6, pp. 3072-3081, November 2015.

[18] K. Clark, N. W. Miller, and J. J. Sanchez-Gasca, "Modeling of GE wind turbine-generators for grid studies," GE Energy, Tech. Rep., April 2010.

What is claimed is:

1. A controller system for a wind-based power system, the controller comprising:
   a vector control-based voltage source converter configured to have feedback control circuitry;
   wherein the feedback control circuitry is configured to modulate either a power order or a dc-link voltage order,
   wherein a first input signal into the controller system is an alternating current (AC) voltage, and
   wherein the feedback control circuitry is configured such that a change in magnitude of the AC voltage is used as an input into the feedback control circuitry to modulate the power order or the dc-link voltage order.

2. The controller system of claim 1, wherein the feedback control circuitry is configured to reduce coupling between an active power and a voltage at a point of common coupling.

3. The controller system of claim 1, wherein a second input signal into the controller system is a d-axis converter current.

4. The controller system of claim 1, wherein the first input signal into the controller system is a voltage at a point of common coupling.

5. The controller system of claim 3, wherein the controller system is configured to modulate either the power order or the de-link voltage order by using the d-axis converter current.

6. The controller system of claim 4, wherein the controller is configured to modulate either a power order or a dc-link voltage order by using the voltage at a point of common coupling.

7. The controller system of claim 1, further comprising:
   an integrator; and a high pass filter connected to the integrator,
wherein the integrator and the high pass filter are configured to modulate the dc-link voltage order.

8. The controller system of claim 1, wherein the controller system is connected to a wind-powered turbine generator.

9. The controller system of claim 1, wherein the controller system is connected to a power grid system.

10. The controller system of claim 9, where the power grid system is a weak grid power system.

11. The controller system of claim 1, wherein the controller system is configured for Type-3 wind.

12. The controller system of claim 1, wherein the controller system is configured for Type-4 wind.

13. The controller system of claim 1, wherein the first input signal is a phase-locked-loop (PLL) voltage of the controller system.

14. The controller system of claim 4, wherein the voltage at a point of common coupling is a PLL voltage.

15. The controller system of claim 3, wherein the first input signal into the controller system is a voltage at a point of common coupling.

16. The controller system of claim 15, wherein the voltage at a point of common coupling is a PLL voltage.

17. A controller system for a wind-based power system, the controller comprising:
a vector control-based voltage source converter configured to have feedback control circuitry;
wherein the feedback control circuitry is configured to modulate either a power order or a dc-link voltage order,
wherein a first input signal into the controller system is an alternating current (AC) voltage,
wherein the feedback control circuitry is configured to reduce coupling between an active power and a voltage at a point of common coupling,
wherein a second input signal into the controller system is a d-axis converter current,
wherein the first input signal into the controller system is a voltage at a point of common coupling,
wherein the controller system is configured to modulate either the power order or the dc-link voltage order by using the d-axis converter current,
wherein the controller is further configured to modulate either a power order or a dc-link voltage order by using the voltage at a point of common coupling,
wherein the controller system further comprises:
an integrator; and
a high pass filter connected to the integrator,
wherein the integrator and the high pass filter are configured to modulate the dc-link voltage order,
wherein the controller system is connected to a wind-powered turbine generator or a weak grid power system,
wherein the controller system is configured for Type-3 wind or Type-4 wind, and
wherein the first input signal is a phase-locked-loop (PLL) voltage of the controller system.

\* \* \* \* \*